United States Patent
Onishi et al.

(10) Patent No.: US 7,933,963 B2
(45) Date of Patent: Apr. 26, 2011

(54) RECEPTION NOTIFICATION CONTROL METHOD AND SYSTEM

(75) Inventors: Taku Onishi, Yokohama (JP); Kunio Yoshikawa, Yokohama (JP); Daichi Funato, Hino (JP); Motoharu Miyake, Yokohama (JP); Shinji Kobayashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 201 days.

(21) Appl. No.: 12/209,663

(22) Filed: Sep. 12, 2008

(65) Prior Publication Data
US 2009/0019125 A1    Jan. 15, 2009

Related U.S. Application Data

(60) Division of application No. 10/311,333, filed on Dec. 31, 2002, now Pat. No. 7,474,890, which is a continuation of application No. PCT/JP02/04370, filed on May 1, 2002.

(30) Foreign Application Priority Data

May 1, 2001   (JP) ................................ 2001-134519

(51) Int. Cl.
    *G06F 15/16* (2006.01)
    *H04L 12/66* (2006.01)
    *H04H 20/71* (2008.01)
(52) U.S. Cl. ........................ 709/206; 370/352; 455/3.01
(58) Field of Classification Search .................. 709/206; 370/352; 455/3.01
    See application file for complete search history.

(56) References Cited

U.S. PATENT DOCUMENTS

| 4,644,472 | A | | 2/1987 | Montgomery |
| 5,664,009 | A | * | 9/1997 | Hurst et al. ................. 379/88.22 |
| 6,094,681 | A | * | 7/2000 | Shaffer et al. ................. 709/224 |
| 6,212,550 | B1 | | 4/2001 | Segur |
| 6,393,296 | B1 | | 5/2002 | Sabnani et al. |
| 6,590,892 | B1 | * | 7/2003 | Lenander et al. ............. 370/352 |
| 6,633,630 | B1 | * | 10/2003 | Owens et al. ............... 379/93.24 |
| 6,636,733 | B1 | * | 10/2003 | Helferich ................... 455/412.2 |
| 7,039,029 | B2 | | 5/2006 | Lee et al. |
| 2002/0032027 | A1 | * | 3/2002 | Kirani et al. .................. 455/426 |
| 2002/0097266 | A1 | | 7/2002 | Hachiya et al. |

(Continued)

FOREIGN PATENT DOCUMENTS

EP         0 889 662 A2      1/1999

(Continued)

OTHER PUBLICATIONS

Patent Abstracts of Japan, JP 07-099508, Apr. 11, 1995 (Reference previously filed in Japanese language on Dec. 31, 2002).

*Primary Examiner* — Alina N Boutah
*Assistant Examiner* — Clarence John
(74) *Attorney, Agent, or Firm* — Oblon, Spivak, McClelland, Maier & Neustadt, L.L.P.

(57) ABSTRACT

A reception notification control method is provided in which an information server that stores information addressed to reception terminals and performs reception notification, via a network apparatus, on each of the reception terminals to which the information stored in the information server is addressed. After receiving, via the network apparatus, a predetermined connection request from a reception terminal to which stored information is addressed, the information server performs the reception notification on the reception terminal.

23 Claims, 14 Drawing Sheets

U.S. PATENT DOCUMENTS

| | | | |
|---|---|---|---|
| 2003/0163519 A1* | 8/2003 | Kegel et al. | 709/203 |
| 2004/0198395 A1* | 10/2004 | Kimoto et al. | 455/456.1 |
| 2004/0209632 A1 | 10/2004 | Link et al. | |
| 2005/0085229 A1 | 4/2005 | Yamaguchi | |
| 2005/0213604 A1* | 9/2005 | Howe | 370/463 |

FOREIGN PATENT DOCUMENTS

| | | |
|---|---|---|
| JP | 6-77995 | 3/1994 |
| JP | 7-99508 | 4/1995 |
| JP | 8-307448 | 11/1996 |
| JP | 10-313338 | 11/1998 |
| JP | 11-98176 | 4/1999 |
| JP | 1215275 A | 4/1999 |
| JP | 11-127186 | 5/1999 |
| JP | 11-136275 | 5/1999 |
| JP | 11-331240 | 11/1999 |
| JP | 2000-78192 | 3/2000 |
| JP | 1275284 A | 11/2000 |

* cited by examiner

FIG.14

| MSN | CID | TIME |
|---|---|---|
| 09000001111 | XXXXXXXX | HH:MM:SS |
| ⋮ | ⋮ | ⋮ |
| ⋮ | ⋮ | ⋮ |
| ⋮ | ⋮ | ⋮ |
| ⋮ | ⋮ | ⋮ |

RECEPTION NOTIFICATION CONTROL METHOD AND SYSTEM

CROSS-REFERENCE TO RELATED APPLICATIONS

This application is a divisional and claims the benefit of priority under 35 U.S.C. §120 from U.S. application Ser. No. 10/311,333, filed Dec. 31, 2002, which is the National Stage of PCT/JP02/04370, filed May 1, 2002, which claims the benefit of priority under 35 U.S.C. §119 of Japanese Patent Application No. 2001-134519, filed on May 1, 2001. The entire contents of these applications are incorporated herein by reference.

FIELD OF THE INVENTION

The present invention relates to a method of controlling reception notification directed to reception terminals, and, more particularly, to a method of controlling reception notification directed to reception terminals that receive reception notifications during communication in a mobile communication system or a cable communication system.

The present invention also relates to a system that performs reception notification control on reception terminals in accordance with the above method of controlling reception notification.

BACKGROUND OF THE INVENTION

In recent years, mobile devices (such as portable telephone machines) used in mobile communication systems, such as a PDC-P (Personal Digital Cellular-Packet) system, have been able to not only have audio communication, but also exchange electronic mails and receive various contents via the Internet. When a mobile device receives an electronic mail, a mail server notifies the mobile device of the reception of the electronic mail that is addressed to the mobile device and has been delivered to the mailbox in the mail server. Upon receipt of this reception notification, the mobile device accesses the mail server to collect the mail. Here, to notify the mobile device of the reception, the mail server transmits a reception notification to the mobile communication system, and a device such as an exchange center node in the mobile communication system establishes a packet link with the mobile device to which the reception notification is directed. Through this packet link, the reception notification is transmitted to the mobile device.

Conventionally, a reception notification directed to a mobile device used in a mobile communication system has been transmitted through a packet link established between the mobile device to which the reception notification is directed and an exchange center node in the mobile communication system, as descried above. However, while a packet link has already been established between the mobile device and the exchange center node (such as a time when the user of the mobile device is reading a homepage), a new packet link is required for performing reception notification when there is a reception directed to the mobile device. In such a situation, as the number of mobile devices in the radio zone increases, the number of packet links established for reception notification also increases. As a result, the resource of packet links that should be used for information transmission and reception is allocated to reception notification, and the network resource cannot be efficiently utilized as a whole.

Also, one of the applications that are most frequently used on the Internet at present is electronic mail. There are roughly two fashions of electronic mail transmission: one is intended for electronic mails that need to be delivered to the other party instantly; and the other is intended for electronic mails such as advertisements that do not need to be delivered to the other party instantly. The former electronic mails will be hereinafter referred to as instant mails, and the latter will be referred to as non-instant mails. In this manner, electronic mails can be classified into two groups. Like the normal mail delivery services, there are instant mails that are equivalent to express mail, and non-instant mails that are equivalent to ordinary mail. In general, express mail is delivered quicker than ordinary mail, and therefore the price rates for express mail are higher than the price rates for ordinary mail. Ordinary mail is delivered at lower costs than express mail, because it requires more days to be delivered. However, even though there are instant mails (equivalent to express mail) and non-instant mails (equivalent to ordinary mail) in the electronic mail delivery services, users have to pay the same price for either of the services. This fact makes the users feel unfairness about the price system.

DISCLOSURE OF THE INVENTION

Therefore, a first object of the present invention is to provide a reception notification control method for mobile devices, by which reception notification directed to mobile devices can be efficiently controlled, so that wasteful use of the network resource can be reduced, and the communication fees to be charged on users can be made fair.

A second object of the present invention is to provide a system that can perform reception notification in accordance with the above reception notification control method.

To achieve the first object, the present invention provides a reception notification control method in which an information server that stores information addressed to reception terminals performs reception notification on each of the reception terminals via a network apparatus. This method includes the steps of: storing information addressed to a reception terminal; and performing reception notification, via the network apparatus, on the reception terminal when receiving a predetermined connection request transmitted from the reception terminal to which the stored information is addressed, as claimed in claim 1. These steps are carried out by the information server.

In a case where this reception notification control method is applied to a mobile communication system, a reception notification is transmitted to a reception terminal (such as a mobile device), with a connection request from the mobile device, such as a connection request for an access to the Web, being a trigger. If electronic mails addressed to the mobile device (hereinafter referred to as the mobile device A) are stored in the mailbox in an information server that serves as a mail server, the mails spooled in the mailbox are checked, with a connection request from the mobile device A being a trigger. If there are stored mails addressed to the mobile device A, reception notification is performed on the mobile device A.

In this manner, by the reception notification control method of the present invention, reception notification can be performed, with a connection request from a mobile device being a trigger.

Also, in a case where this reception notification control method is applied to a cable communication system, reception notification can be performed on a reception terminal (such as a personal computer), with a connection request (in this case, a connection request for connection to a network apparatus such as an exchange center apparatus in the cable communication system) from the reception terminal being a trigger.

To perform reception notification using a link that has already established during communication in the above reception notification control method in accordance with the present invention, the reception notification directed to the reception terminal is performed using a predetermined communication line that has already been established between the reception terminal and the network apparatus, as claimed in claim 2.

In this reception notification control method, the information used for the reception notification is loaded on a predetermined communication line (such as a packet link) that has already been established upon receipt of a connection request, and the reception notification is transmitted to the mobile device A. Accordingly, there is no need to establish an unnecessary communication line, unlike the prior art in which a communication line is established just for performing reception notification. Thus, the network resource can be efficiently utilized, and increases of the load on the network apparatus can be restricted.

The above effects can be obtained not only with a mobile communication system but also with a cable communication system. In a case of a cable communication system, reception notification is performed on a reception terminal using a predetermined communication line if it has already been established between the reception terminal and the network apparatus provided in the cable communication system. Accordingly, the network resource of the network apparatus provided in the cable communication system can be efficiently utilized.

Also, in the above reception notification control method in accordance with the present invention, the information server determines whether the reception terminal to which the stored information is addressed is in communication with the network apparatus, from intrinsic information of the reception terminal contained in the information.

When determining that the reception terminal is in communication with the network apparatus, the information server performs reception notification on the reception terminal, as claimed in claim 3.

In a case where this reception notification control method is applied to a mobile communication system, for example, when receiving mails addressed to a reception terminal (such as a mobile device), the mailbox in the mail server determines whether the reception terminal is in communication with the network apparatus, from the information (such as the subscriber information) as to the address of the mobile device. If the mobile device is determined to be in communication in the determining step, the mails stored in the mailbox are checked, and, if there are stored mails addressed to the mobile device, reception notification is performed on the mobile device. More specifically, when mails addressed to a mobile device are stored in a mail server, the mail server determines whether the mobile device to which the stored mails are addressed is in communication. If the mobile device is determined to be in communication, the reception notification information is loaded on a predetermined communication line (or a link) that has been established for the communication, and is then transmitted to the mobile device. As the already established link can be used for the reception notification directed to the mobile device, there is no need to establish a new link just for the reception notification. Thus, the network resource can be efficiently utilized.

In a case where this reception notification control method is applied to a cable communication system, when a mail arrives in the mailbox, the mailbox determines whether the reception terminal to which the mail is addressed is connected to the network. When determining that the reception terminal is connected to the network, the mailbox performs the reception notification with respect to the mail on the reception terminal.

To control reception notification in accordance with the attributes of information in the above reception notification control method, the information server classifies information in accordance with identification information attached to the information by the transmitters of the information. Among the classified information, the information server holds the information having predetermined identification information attached thereto. When receiving a predetermined connection request, via the network apparatus, from the reception terminal to which the held information is addressed, the information server performs the reception notification on the reception terminal, as claimed in claim 4.

In a case where this reception notification control method is applied to a mobile communication system, for example, mails that have arrived in the mailbox in a mail server are classified according to the priorities on delivery time, and are then stored separately. Here, the selection of the priorities on delivery time is made by the users of the mobile devices which have transmitted the mails.

Among the mails stored in the mailbox in the above manner, information having lower priorities on delivery time is not transmitted as a reception notification to the mobile device to which the information is directed, but is temporarily held and transmitted as a reception notification to the mobile device when the mobile device enters communication with the network apparatus. Accordingly, reception notification is not instantly performed for the mails that do not require instant delivery to the mobile devices to which the mails are addressed among the mails stored in the mailbox. Thus, the network resource provided for reception notification can be efficiently utilized.

To establish a fair price system for information providing services depending on whether information requires instant delivery in the above reception notification control device of the present invention, the identification information indicates whether information to be distributed requires instant delivery, as claimed in claim 5.

In this reception notification control method, normal fees are applied to instant mails, while discount fees are applied to non-instant mails, so that the price rates for these two types of mails can be differentiated. Accordingly, the communication fees to be charged on users can be made fair, compared with the prior art in which uniform fees are charged on users irrespective of the priorities on delivery time.

To achieve the first object, the present invention also provides a reception notification control method in which an information server that stores information addressed to reception terminals and performs reception notification on each of the reception terminals via a network apparatus, with a node device being interposed between the network apparatus and the information server. This reception notification control method includes the steps of: determining the communication state of a reception terminal in accordance with a control signal that is transmitted when a communication line is established between the reception terminal and the network apparatus; inquiring of the information server whether there is stored information addressed to the reception terminal, after determining that the reception terminal is in communication with the network apparatus; and performing reception notification on the reception terminal, depending on the result of the inquiry, as claimed in claim 6. These steps are carried out by the node device.

By this reception notification control method, the node device determines the communication state of a reception terminal, and inquires of the information server whether there is a reception directed to the reception terminal. If there is stored information addressed to the reception terminal in the information server, reception notification directed to the reception terminal can be performed using a predetermined communication line that has been established at the time of communication. Thus, the network resource can be efficiently utilized.

Also in the above reception notification control method in accordance with the present invention, when the reception terminal is determined to be in communication, the node device registers the communication state of the reception terminal in a call information management table. Upon receipt of a reception directed to the reception terminal from the information server, the node device acquires the communication state of the reception terminal from the call information management table. When the reception terminal is determined to be in communication, the node device performs reception notification on the reception terminal, using a predetermined communication line that has already been established, as claimed in claim 7.

By this reception notification control method, the node device manages the communication state of each reception device, and performs reception notification on a reception device, using a predetermined communication line that has been established when a reception notification directed to the reception terminal is transmitted to the reception terminal during communication.

Further, in the above reception notification control method of the present invention, the node device is provided with a packet conversion function that enables itself to have communication with the reception terminal via the network apparatus, as claimed in claim 8.

To achieve the second object, the present invention also provides a reception notification system in which an information server that stores information addressed to reception terminals and performs reception notification on each of the reception terminals to which the information is addressed. This reception notification system includes: a reception notification trigger receiving part that receives a predetermined connection request transmitted from a reception terminal to which information stored in the information server is addressed, with the information server storing all information addressed to the reception terminals; and a reception notifying part that performs reception notification on the reception terminal when the reception notification trigger receiving part receives the connection request, as claimed in claim 9. In this reception notification system, the reception notification trigger receiving part and the reception notifying part are contained in the information server.

The other objects, features, and advantages of the present invention will become more apparent from the following description, with reference to the accompanying drawings.

BRIEF DESCRIPTION OF THE DRAWINGS

FIG. 14 illustrates an example of a call information management table that is managed in the protocol conversion device.

PREFERRED EMBODIMENTS FOR CARRYING OUT THE INVENTION

The following is a description of embodiments of the present invention, with reference to the accompanying drawings.

Referring first to a mobile communication system shown in FIG. 1, the principles of the present invention will be described.

Figure 1:
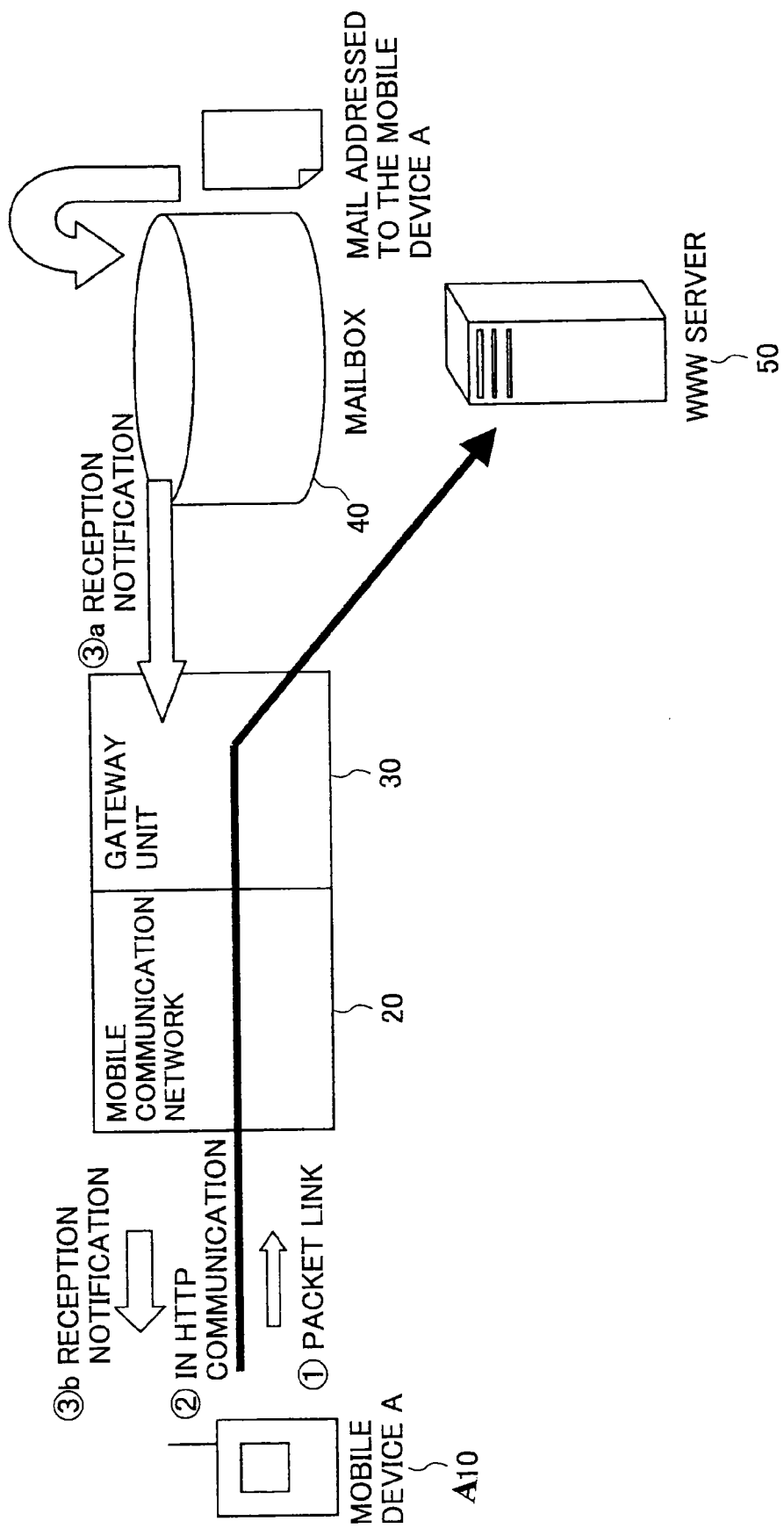
FIG. 1 illustrates a reception notification control method in accordance with the present invention.

In FIG. 1, a mobile device A10 can obtain information, such as electronic mails addressed to the mobile device A itself that are spooled in a mailbox 40 in a mail server (i.e., an information server), via a mobile communication network 20 and a gateway unit 30. Hereinafter, the information server used in the embodiments of the present invention will be a mail server.

The mobile communication network 20 sets a predetermined link with the mobile device A10. The mobile communication network 20 notifies the mobile device A10 of reception of a mail that has arrived in the mailbox 40, and distributes mails stored in the mailbox 40 in response to a mail collection request from the mobile device A10. The gateway unit 30 converts protocols used in the mobile communication network 20 into protocols that can be used in various information servers (such as the mail server and a WWW sever 50), and also serves as an interface with each information server.

Referring again to FIG. 1, the principles of the present invention will be described in greater detail.

When a user of the mobile device A10 performs a predetermined key input operation to make an access to a homepage, a packet link (①) is established between the mobile device A10 and the mobile communication network 20/the gateway unit 30. In this case, a TCP connection is established, so that an HTML document is transmitted and received between the WWW server 50 and the mobile device A10 that is a WWW client. Here, this situation is referred to as "in HTTP communication", as indicated by ② in FIG. 1.

The gateway unit 30 monitors the communication between the mobile device A10 and the gateway unit 30 itself, and, through this monitoring, the gateway unit 30 can determine whether the packet link (①) has been established between the mobile device A10 and the gateway unit 30. When the packet link (①) is detected through the monitoring, the gateway unit 30 generates and transmits a signal that serves as a trigger for the mailbox 40 to determine whether mails addressed to the mobile device having the packet link (①) established (the mobile device A10 in this case) are spooled therein. Upon receipt of the trigger, the mailbox 40 determines whether mails addressed to the mobile device A have arrived. If they have, the mailbox 40 sends the gateway unit 30 a reception notification as to mails addressed to the mobile device A10 (③a). Upon receipt of the reception notification from the mailbox 40, the gateway unit 30 transfers the reception notification to the mobile communication network system 20. Using the packet link that has already been established with the mobile device A10, the mobile communication network system 20 transmits a U-Plane (User-Plane) reception notification message to the mobile device A10 (③b). After receiving the reception notification message, the mobile device A10 performs a regular mail collecting operation.

In this manner, if there exists the packet link (①) already established between the mobile device A10 and the mobile communication network 20/the gateway unit 30, the reception notification is performed on the mobile device A10, using the packet link (①). In short, the mobile device A10 is notified of a reception in the HTTP communication (②) in this embodiment. Accordingly, there is no need to establish a new packet link in the present invention, unlike the prior art in which a new packet link is established just to transmit a reception notification to a mobile device. Thus, the network resource can be saved and utilized more efficiently.

Figure 2:
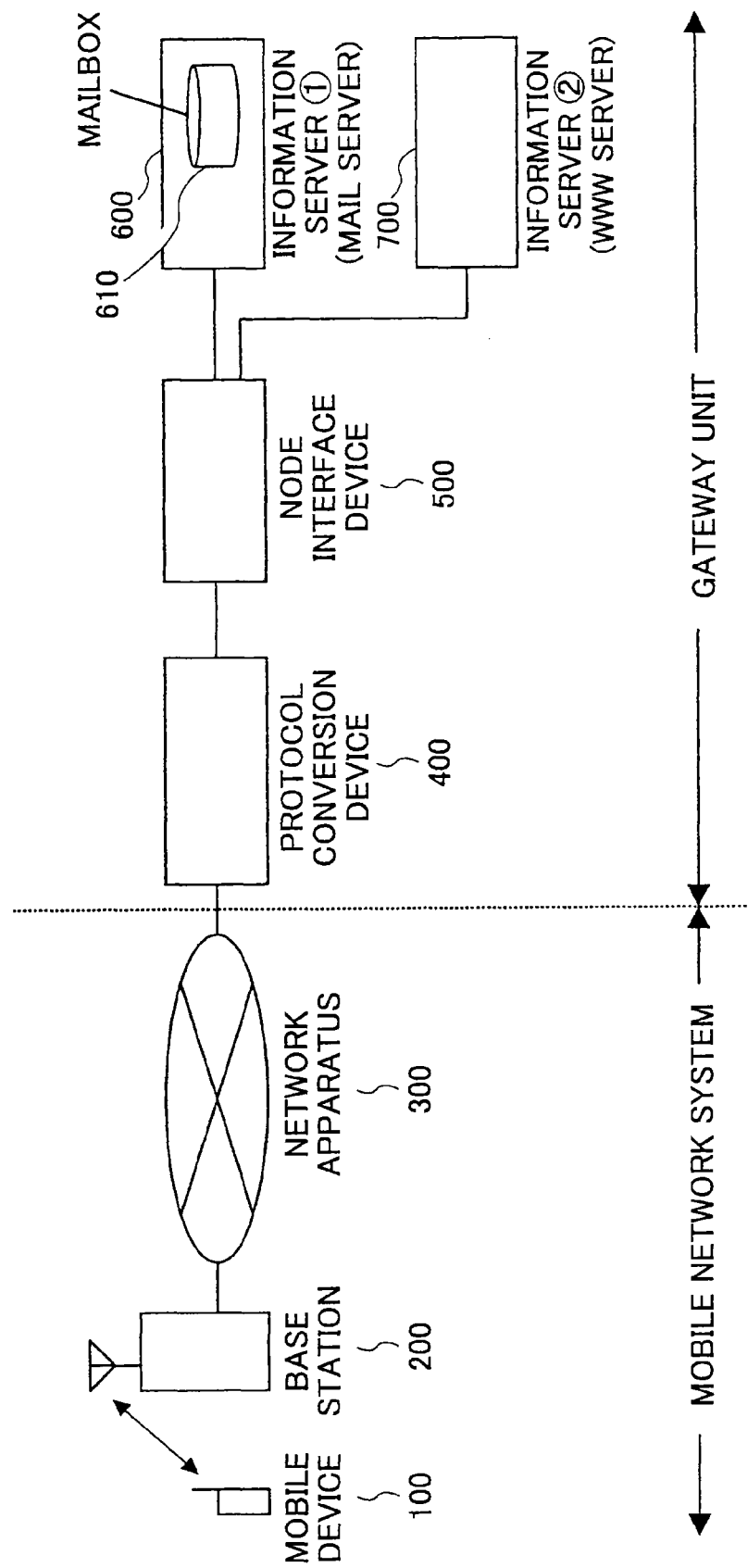
FIG. 2 illustrates an example of a system structure to which the reception notification control method is applied as an embodiment of the present invention.

Referring now to FIG. 2, a specific example of the system structure that embodies the present invention will be described.

As shown in FIG. 2, this system can be roughly divided into the mobile communication network system 20 and the gateway unit 30. In general, the mobile communication network system 20 includes a mobile device 100, a base station 200, and a network apparatus 300 (such as a switching center apparatus). The mobile device (a portable telephone machine) 100 performs wireless communication with the base station 200, and receives data (packet data) distributions from the information server included in the gateway 30 via the network apparatus 300. The gateway unit 30 includes a protocol conversion device 400, a node interface device 500, an information server ① 600 (a mail server), and an information server ② 700 (a WWW server). In general, the protocol conversion device 400 is interposed between the network apparatus 300 of the mobile communication network system and the node interface device 500, and converts the protocols used in the mobile communication network system into protocols that can be used in the information servers (such as the mail server 600 and the WWW server 700), as described above. The node interface device 500 serves as an interface between the protocol conversion device 400 and the information servers 600 and 700. The mail server 600 and the WWW server 700 are employed as the information servers to provide electronic mails and HTML documents.

Referring now to a sequence diagram shown in FIG. 3, the process of transmitting a reception notification in the above system structure by a reception notification control method in accordance with the present invention will be described.

Figure 3:
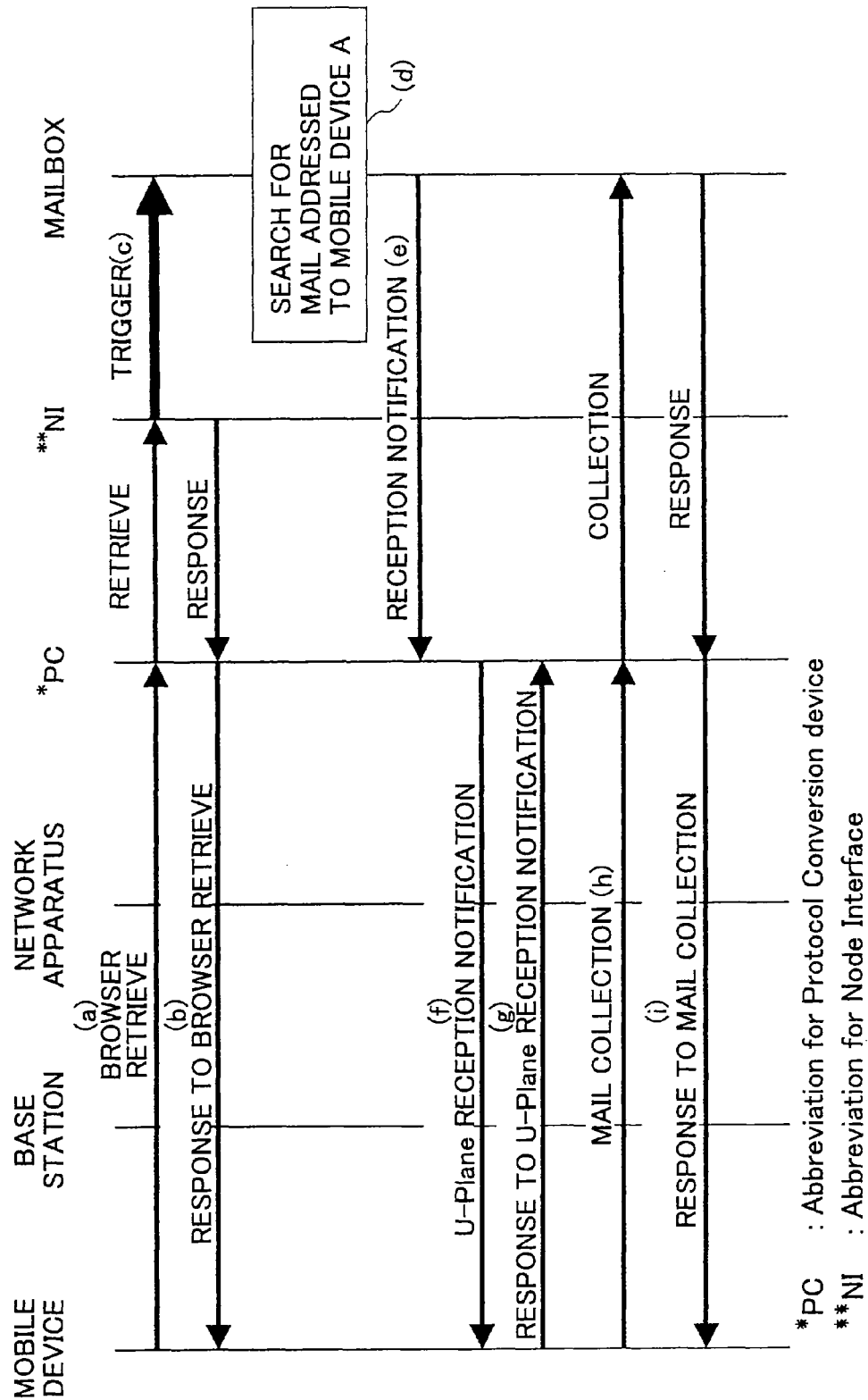
FIG. 3 is a first sequence diagram of the procedures for transmitting a reception notification in accordance with the reception notification control method of the present invention.

In FIG. 3, when the mobile device 100 makes a connection request for an access to the Web, the URL of the HTML document to be displayed on request is transmitted, and a signal for retrieving the HTML document from the WWW server, i.e., a "browser retrieve" signal (a), is sent to the node interface device 500 via the base station 200, the network apparatus 300, and the protocol conversion device 400. Upon receipt of the "browser retrieve" signal, the node interface device 500 transmits a signal as a reply to the reception to the mobile device 100 (b), and provides a mailbox 610 in the mail server 600 with an instruction (a trigger) (c) for determining whether mails addressed to the mobile device 100 having requested for an access to the Web are spooled in the mailbox 610 (d).

In the mailbox 610, whether mails addressed to the mobile device 100 are spooled (d) is determined in accordance with the received trigger (c). If mails addressed to the mobile device 100 are found through the detection (d), a reception notification (e) to notify the mobile device 100 of the mail reception is sent to the protocol conversion device 400 via the node interface device 500. The reception information contained in the reception notification is then sent as a U-Plane reception notification (f) to the mobile device 100. Receiving the U-Plane reception notification, the mobile device 100 returns a response (g) to the protocol conversion device 400 of the gateway unit 30. Realizing that there are mails addressed to it, the mobile device 100 receives the mails through a regular mail collecting operation (h and i).

As described above, in accordance with the present invention, when a connection request for an access to the Web is made from the mobile device 100, it is first determined whether mails addressed to the mobile device 100 are spooled in the mailbox. If there are stored mails addressed to the mobile device 100, a reception notification with respect to the stored mails is transmitted to the mobile device 100. In short, with the connection request from the mobile device 100 being a trigger, the reception notification directed to the mobile device is performed. Here, the information contained in the reception notification is loaded on the packet link that has been established upon receipt of the connection request from the mobile device 100, so that the reception notification can be sent to the mobile device 100 without another packet link just for reception notification. Accordingly, there is no need to establish a new packet link for reception notification, and the network resource can be efficiently utilized.

As described earlier, the trigger is supplied from the node interface device 500 to the mailbox 610. This trigger is generated in the node interface device 500 and then transmitted in the manner shown in FIG. 4.

Figure 4:
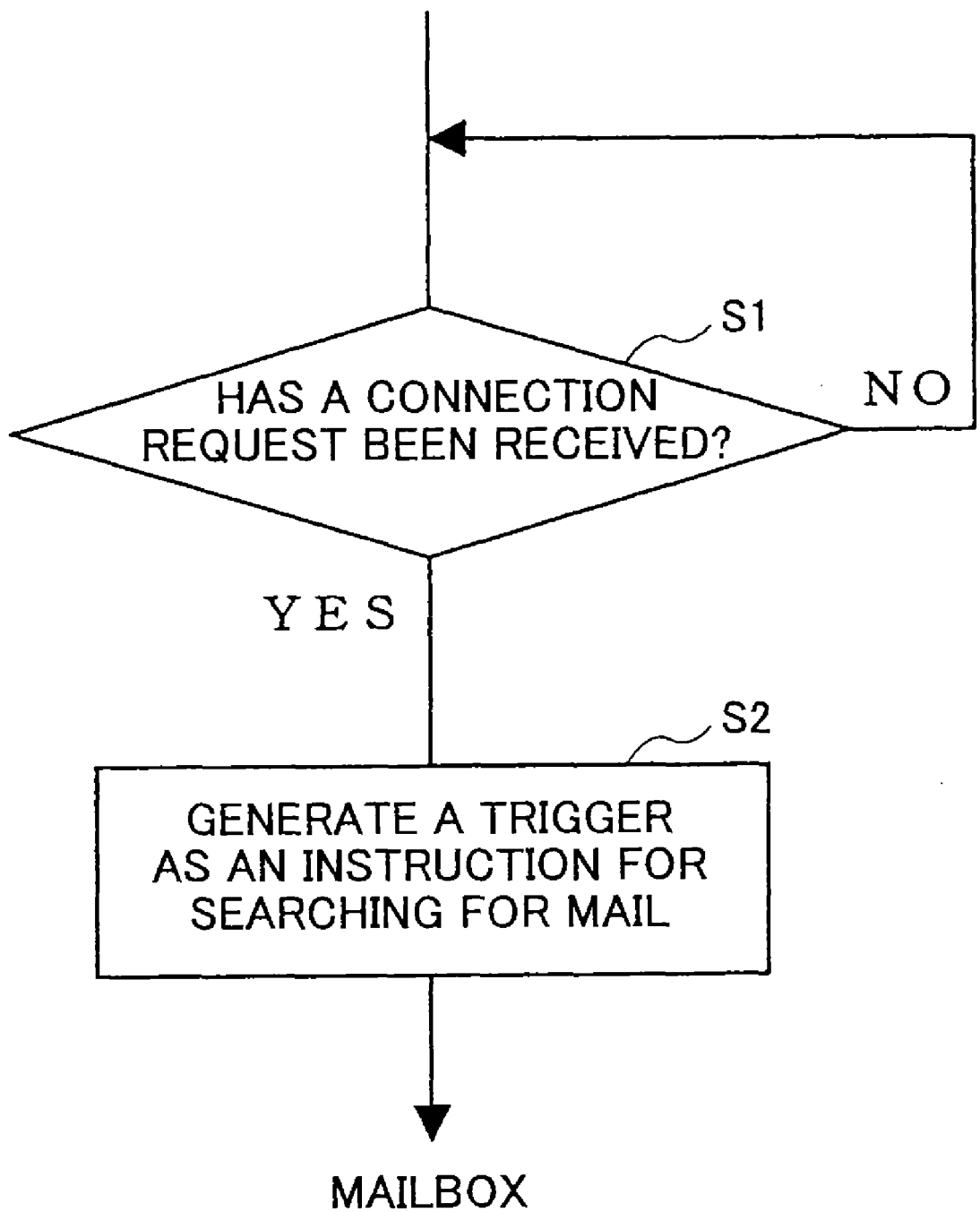
FIG. 4 is a flowchart of an example of the process of generating a trigger to be transmitted from a node interface device.

In FIG. 4, the node interface device 500 constantly determines whether a "connection request" for an access to the Web has been transmitted from the mobile device 100 (S1). If having received the "connection request" via the protocol conversion device 400 ("YES" in S1), the node interface device 500 detects the subscriber number of the mobile device 100 from the information contained in the "connection request", and generates and transmits a trigger signal to the mailbox 610 (S2). The trigger signal serves as an instruction to search for mails addressed to the mobile device 100. In accordance with the trigger signal transmitted from the node interface device 500, the mailbox 610 starts searching for mails addressed to the mobile device 100. Meanwhile, if not having received the "connection request" ("NO" in S1), the node interface device 500 stands by for receiving the "connection request".

In the above embodiment, the trigger signal is generated in the node interface device 500 upon receipt of a connection request from the mobile device 100, and is then transmitted to the mailbox 610. In accordance with the information as to the mobile device 100 contained in the trigger, the mailbox 610 determines whether mails addressed to the mobile device 100 are spooled therein. If there are spooled mails addressed to the mobile device 100, a reception notification is transmitted to the mobile device 100. In short, the trigger starts the reception notifying operation.

Figure 5:
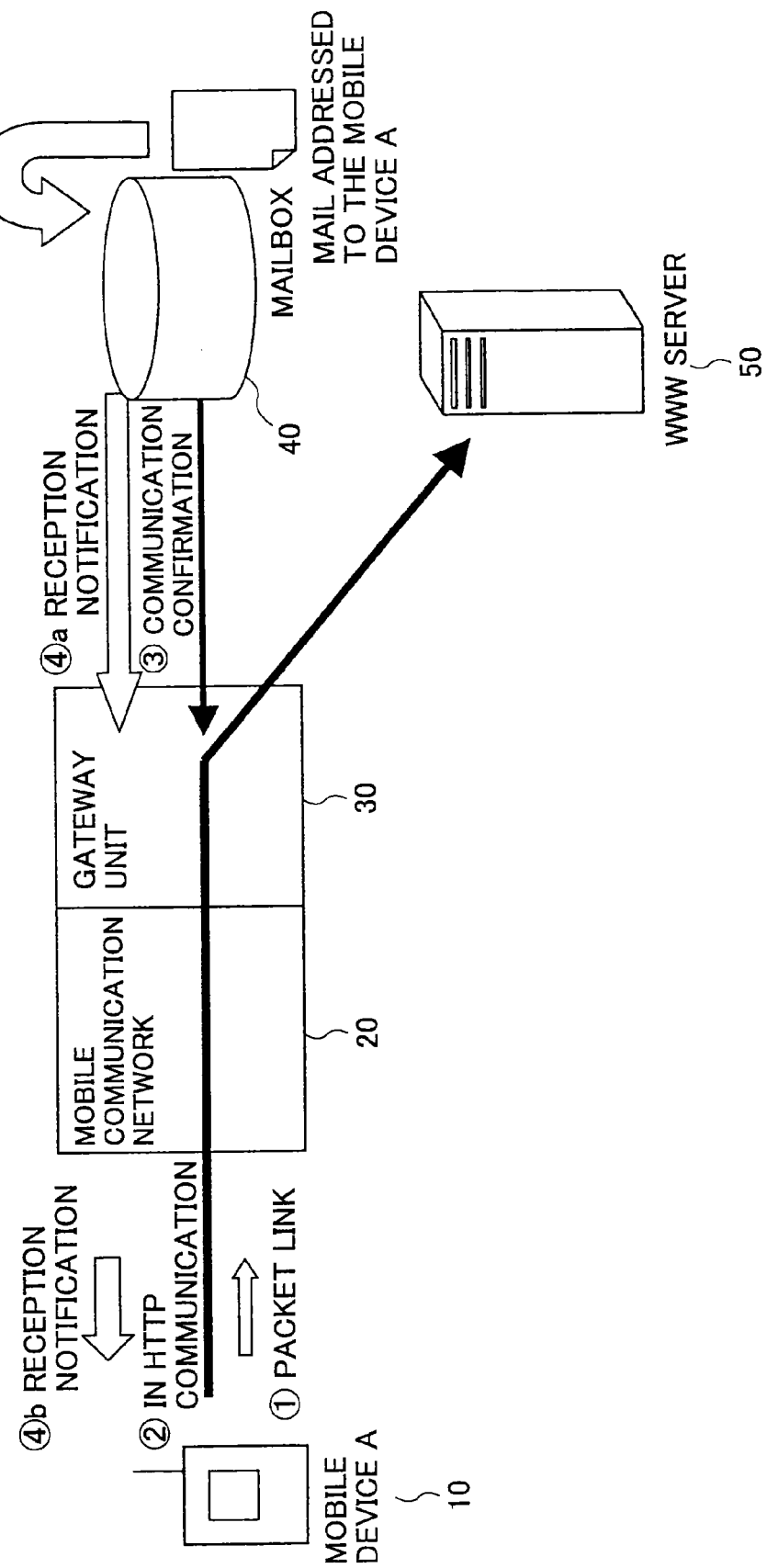
FIG. 5 illustrates a modification of the embodiment to which the reception notification control method of the present invention is applied.

Referring now to FIG. 5, a modification of the above embodiment to which the reception notification control method in accordance with the present invention is applied will be described.

In FIG. 5, a packet link (①) has already been established between the mobile device A10 and the mobile communication network 20/the gateway unit 30 in the same manner as shown in FIG. 1, and the mobile device A10 is in HTTP communication (②) with the mobile communication network 20/the gateway unit 30. After a mail addressed to the mobile device A10 arrives in the mailbox 40, the mailbox 40 generates a communication confirmation signal (③) to determine whether the mobile device A10 is in HTTP communication with the mobile communication network 20/the gateway unit 30, from the information (such as the address of the mobile device to which the mail is addressed) contained in the mail. The mailbox 40 then transmits the communication confirmation signal (③) to the gateway unit 30. An example of the process of generating this communication confirmation signal (③) is shown in FIG. 6.

Figure 6:
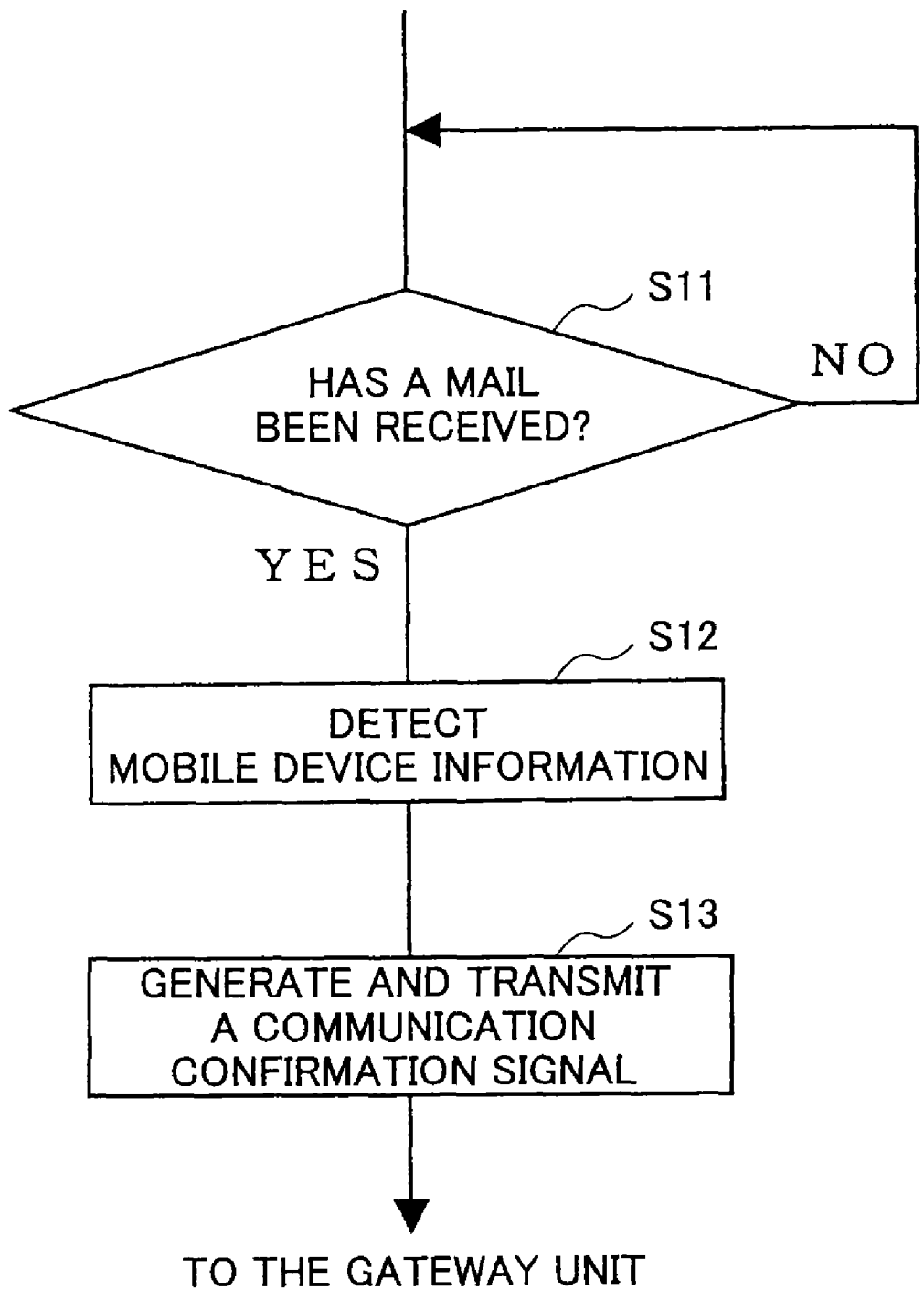
FIG. 6 is a flowchart of an example of the process of generating a communication confirmation signal to be transmitted from a mailbox.

In FIG. 6, the mailbox 40 receives a mail (S11). From the mail, the mailbox 40 detects mobile device information such as the address of the mobile device A10 to which the mail is addressed (S12). The mailbox 40 then generates a communication confirmation signal to determine whether the mobile device A10 is in communication with the mobile communication network 20/the gateway unit 30, and transmits the signal to the gateway unit 30 (S13).

Referring now to a sequence diagram shown in FIG. 7, the procedures that follow the above process will be described.

Figure 7:
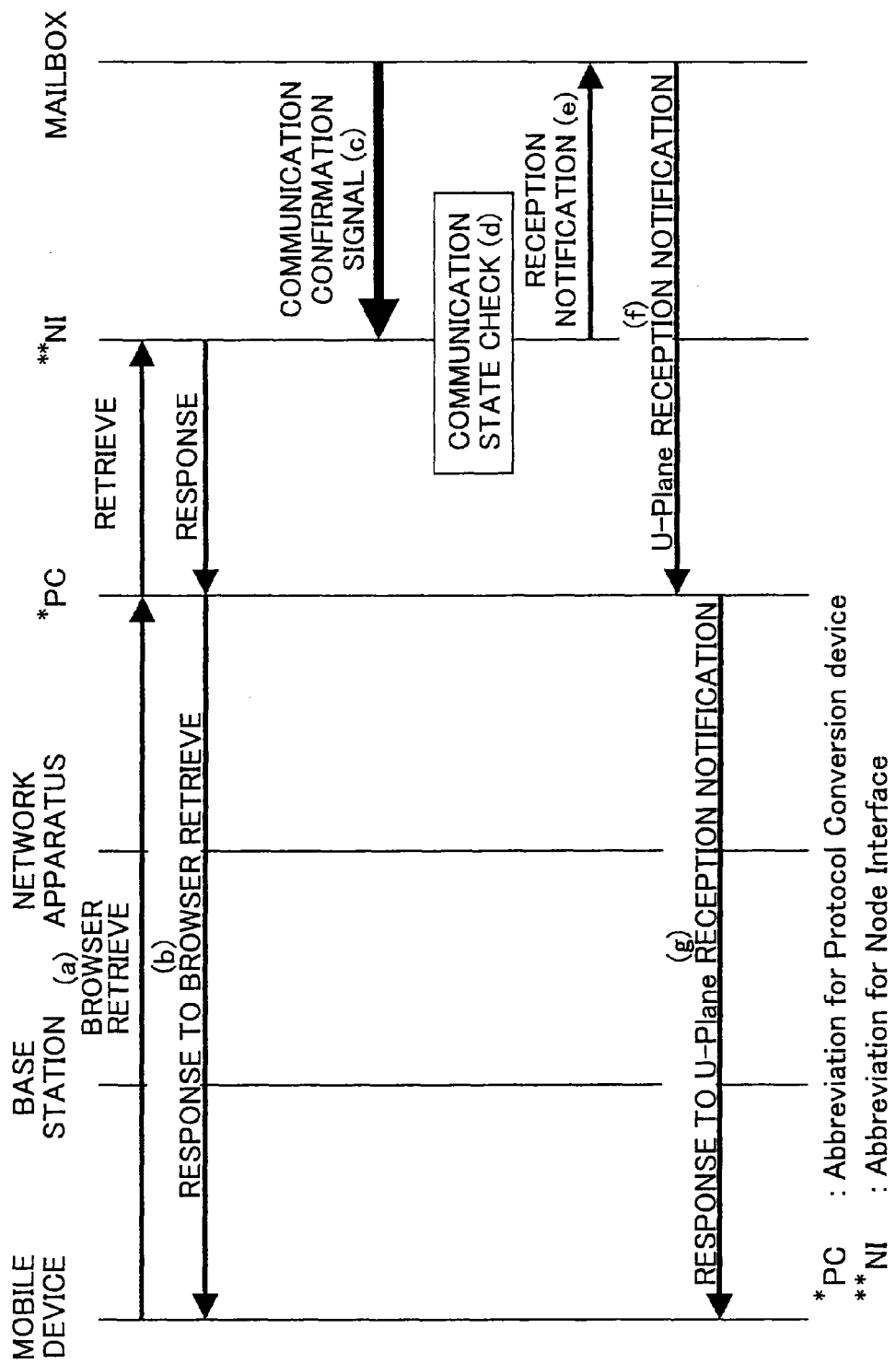
FIG. 7 is a second sequence diagram of the procedures for transmitting a reception notification in accordance with the reception notification control method of the present invention.

In FIG. 7, a case where a browser retrieving operation has already been performed between the mobile device A10 and the mobile communication network 20/the gateway unit 30 is shown (see the procedures (a) and (b).

After receiving the communication confirmation signal from the mailbox 40 (c), the gateway unit 30 determines whether the mobile device A10 to which the mail is addressed is currently in communication (such as HTTP communication) with the mobile communication network 20 (d). If it is determined that the mobile device A10 is in communication, the gateway unit 30 returns a response indicating "being in communication" to the mailbox 40 (e). Upon receipt of the response indicating "being in communication", the mailbox 40 sends a reception notification with respect to this mail to the node interface device 500 (f). The node interface device 500 transfers the reception notification to the protocol conversion device 400 (f). The protocol conversion device 400 loads the reception information contained in the reception notification on a U-Plane reception notification, and then transmits the U-Plane reception notification to the mobile device A10 (g) (see the procedures ④a and ④b in FIG. 5).

As described above, after receiving a mail addressed to the mobile device A10, the mailbox 40 transmits a communication confirmation signal to the gateway unit 30 so as to determine whether the mobile device A10 is in communication (HTTP communication in this case) with the mobile communication network 20. Accordingly, the mailbox 40 performs reception notification with respect to the mail only when the mobile device to which the mail is addressed is in communication. As a result, the same effects as the effects of the embodiment shown in FIG. 1 can be obtained from this modification. In short, unnecessary packet links are not established, and the network resource can be efficiently utilized also in this modification.

Although an embodiment and a modification in which reception notification is performed while the mobile device is in communication have been described so far, mails stored in the mailbox 610 (same as shown in FIG. 2) may be classified in accordance with predetermined criteria, and reception notification may be controlled depending on the classification of the mails in accordance with another modification of the embodiment of the present invention. For example, received mails can be classified based on the criteria shown in FIG. 8. This classifying process shown in FIG. 8 is carried out with the system structure shown in FIG. 2.

Figure 8:
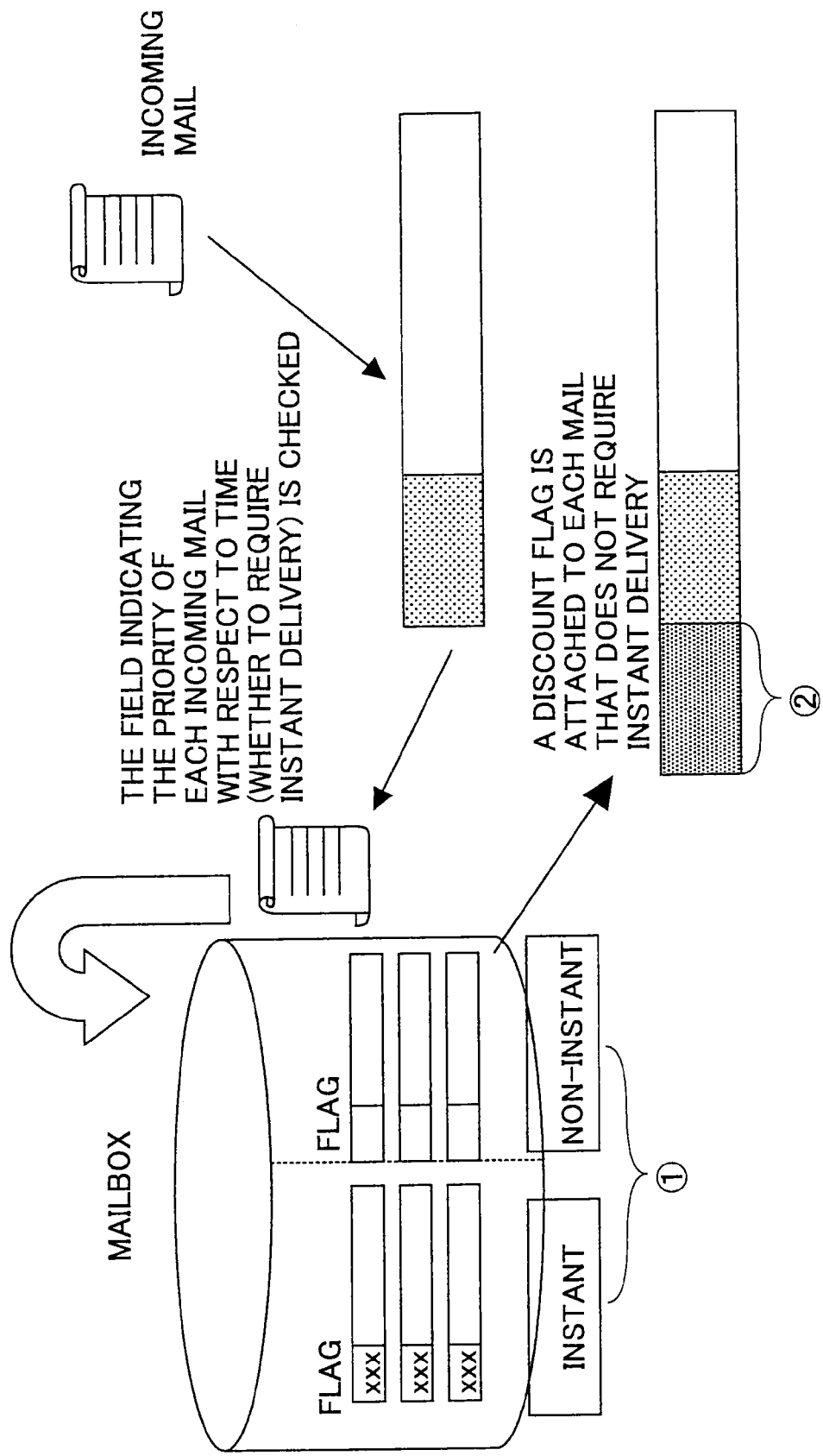
FIG. 8 illustrates an example of a method of managing mails stored in a mailbox.

In FIG. 8, the mailbox 610 classifies arrived mails into two groups: one is a group of mails that require instant delivery; and the other is a group of mails that do not require instant delivery (that are to be delivered while the user is in on-line communication). The mailbox 610 manages the classified mails separately from each other group. For instance, to indicate whether each received mail requires instant delivery, a delivery timing header that indicates whether instant delivery is required is attached to the mail, as shown in FIG. 8. By checking the flag of the delivery timing header, it can be determined whether the mail requires instant delivery (① in FIG. 8).

Figure 9:
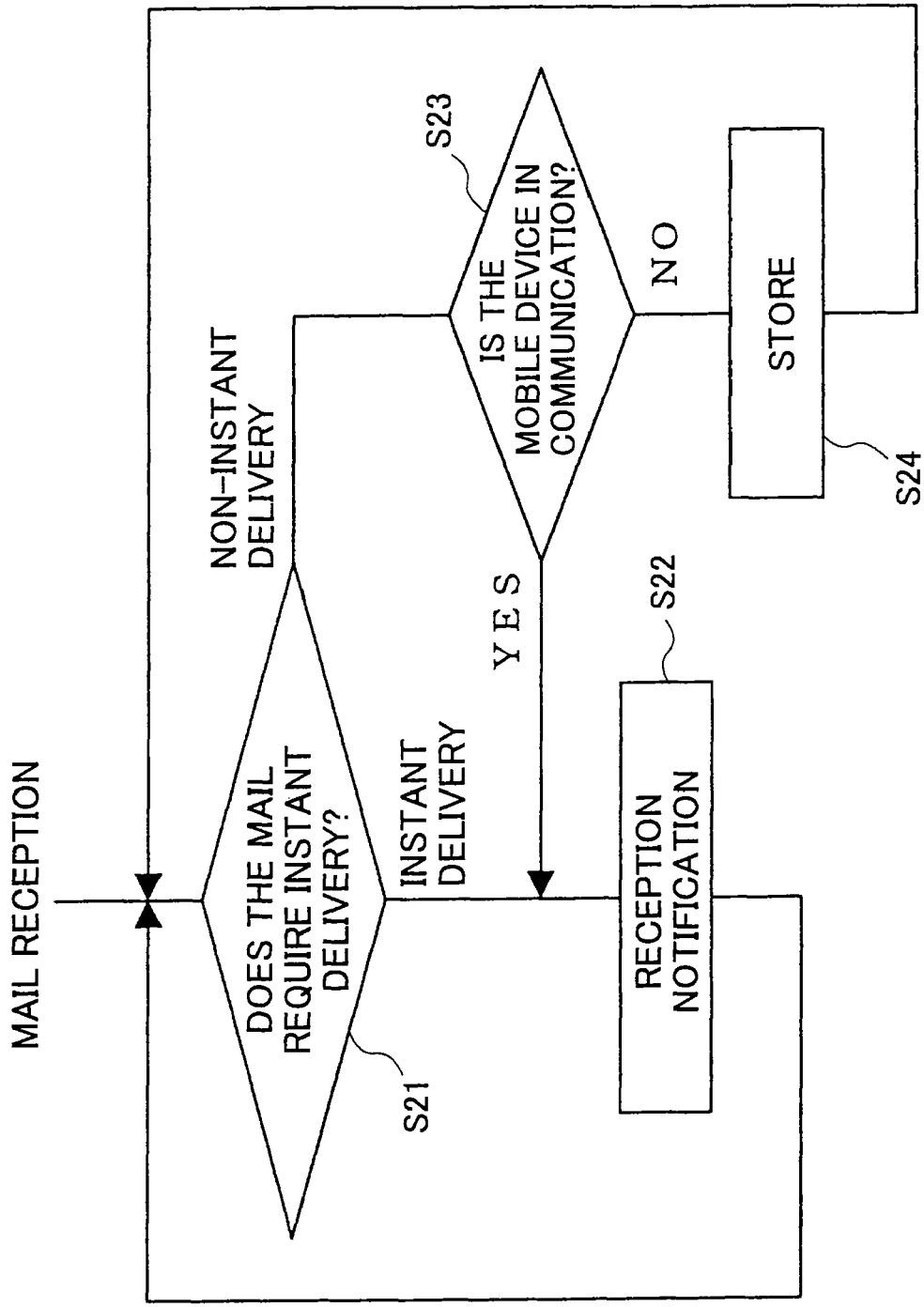
FIG. 9 is a flowchart of an example of the process of performing reception notification, depending on whether the mail requires instant delivery.

The deliver timing of each received mail is determined and managed, so that reception notification can be performed in different manners for instant mails and non-instant mails (i.e., mails that do not require instant delivery). FIG. 9 shows an example of the reception notification control process in which reception notification is performed in different manners between instant mails and non-instant mails.

In FIG. 9, upon receipt of a mail, the mailbox 610 checks the flag of the delivery timing header attached to the mail, and determines whether the mail requires instant delivery (S21). If it is determined that the mail requires instant delivery ("INSTANT" in step S21), the mailbox 610 transmits a reception notification to the mobile device 100 to which the mail is addressed, so as to prompt the mail device 100 to collect the mail. After transmitting the reception notification to the mobile device 100, the mailbox 610 stands by for receiving the next mail.

Meanwhile, if it is determined that the mail is a non-instant mail that does not require instant delivery in the determining step ("NON-INSTANT" in step S21), the mailbox 610 conducts a communication state check so as to determine whether the mobile device 100, to which the mail is addressed, is in communication (S23). This communication state check is performed in the manner described above with reference to FIG. 5. More specifically, the mailbox 610 sends the gateway unit 30 a communication confirmation signal to check the communication state of the mobile device 100 (see ③ in FIG. 5). When receiving a response (indicating whether the mobile device 100 is in communication) from the gateway unit 30, the mailbox 610 can recognize the communication state of the mobile device 100 (S23). If the mobile device 100 is determined to be in communication ("YES" in step S23), the mailbox 610 performs reception notification on the mobile device 100 (S22). On the other hand, if the mobile device 100 is determined not to be in communication ("NO" in step S23), the mailbox 610 does not perform reception notification on the mobile device 100, and temporarily stores the mail as a non-instant mail (S24). After storing the non-instant mail, the mailbox 610 returns to the mail reception waiting state.

In this manner, when receiving a non-instant mail, the mailbox 610 checks the communication state of the mobile device 100 to which the non-instant mail is addressed, and, only if the mobile device 100 is in communication, does the mailbox 610 notify the mobile device 100 of the reception of the non-instant mail. Thus, mails that do not require instant delivery are transmitted to the user only when he/she is in communication, and the resource in the radio section can be efficiently utilized.

Although the communication state of the mobile device 100 is checked when the mailbox 610 receives a non-instant mail in the above procedures, the non-instant mail may be temporarily stored in the mailbox 610 and transmitted to the mobile device when a connection request is made from the mobile device 100 to which the non-instant mail is addressed. This process may be carried out in the procedures shown in FIG. 10.

Figure 10:
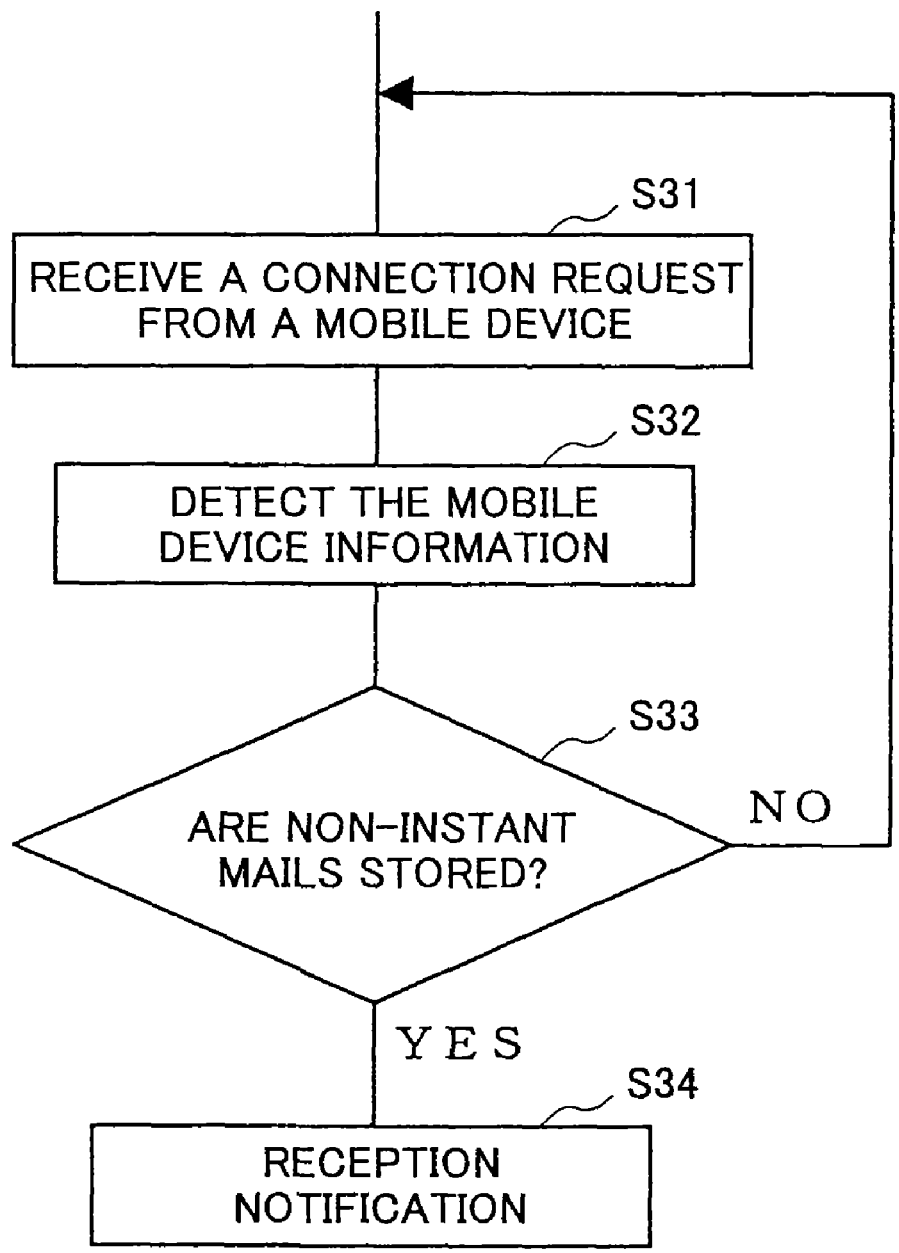
FIG. 10 is a flowchart of an example of the process of performing reception notification depending on a connection request from a mobile device.

In FIG. 10, the mailbox 610 receives a connection request (such as a connection request for an access to the Web) from the mobile device 100 (S31), and detects the mobile device information (such as the subscriber number) of the mobile device 100 that has made the connection request (S32). The mailbox 610 then determines whether non-instant mails addressed to the mobile device 100 have been stored (S33). If it is determined that there are non-instant mails addressed to the mobile device 100 ("YES" in step S33), the mailbox 610 transmits a reception notification to the mobile device 100 with respect to the stored non-instant mails (S34). On the other hand, if it is determined that there are no non-instant mails addressed to the mobile device 100 ("NO" in step S33), there are no mails stored in the mailbox 610 that requires a reception notification, and the mailbox 610 again awaits a connection request from the mobile device 100.

In this manner, the mailbox 610 determines whether there are spooled non-instant mails addressed to the mobile device 100 upon receipt of a connection request from the mobile device 100. If there are stored non-instant mails addressed to the mobile device 100, the mailbox 610 transmits a reception notification to the mobile device 100 with respect to the stored non-instant mails. For example, reception notification with respect to non-instant mails stored while the mobile device 100 is switched off can be collectively performed when the mobile device 100 transmits a connection request. Thus, the radio resource can be efficiently utilized.

Furthermore, in accordance with the present invention, a discount flag is attached to each non-instant mail (②in FIG. 8), so that non-instant mails can be delivered at lower price rates than instant mails. Thus, a wider price range can be realized.

Figure 11:
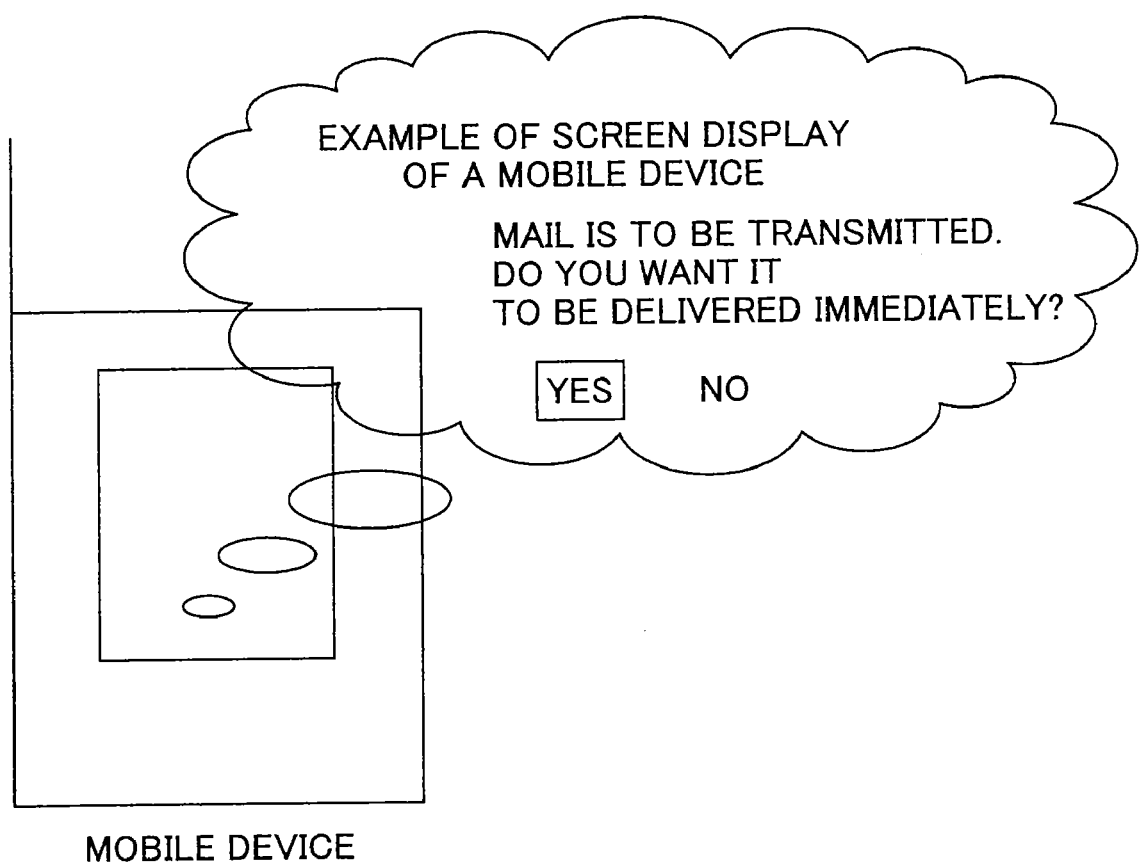
FIG. 11 illustrates an example of the screen display of a mobile device to determine the priority of a mail to be transmitted.

It can be expected that advertisement distributors who do not require instant delivery would use the discount mail service, as well as individuals who send mails that do not require the other party to read them immediately. The present invention also satisfies the demand of those individual users. For example, a header that indicates whether to require instant delivery can be attached to each mail to be transmitted. In the process of attaching the header, a message "The mail is about to be transmitted. Do you want it to be delivered instantly?" is shown on the display screen of the mobile device, as shown in FIG. 11. The user of the mobile device should simply select "YES" or "NO". In accordance with the selection made by the user, the header indicating whether to require instant delivery is attached to each mail.

In this manner, a message for inquiring of the user of the mobile device 100 whether to require instant delivery is displayed on the display screen of the mobile device 100 prior to the transmission of each mail, so that the convenience of each individual user can be increased. Also, the price rates for instant information distribution are overtly differentiated from the price rates for non-instant information distribution, so that a wider price system that can satisfy the demands of all users can be established.

Although reception notification control is performed on the mobile device 100 when the mailbox 610 receives a connection request from the mobile device 100 in the above embodiment, the present invention is not limited to that. For example, a node device (such as the protocol conversion device 400) interposed between the network apparatus 300 and the information server such as the mailbox 610 may perform reception notification control on the mobile device. In the following, with a protocol conversion device being taken as an example of such a node device, the reception notification control operation to be performed on the mobile device 100 will be described.

Figure 12:
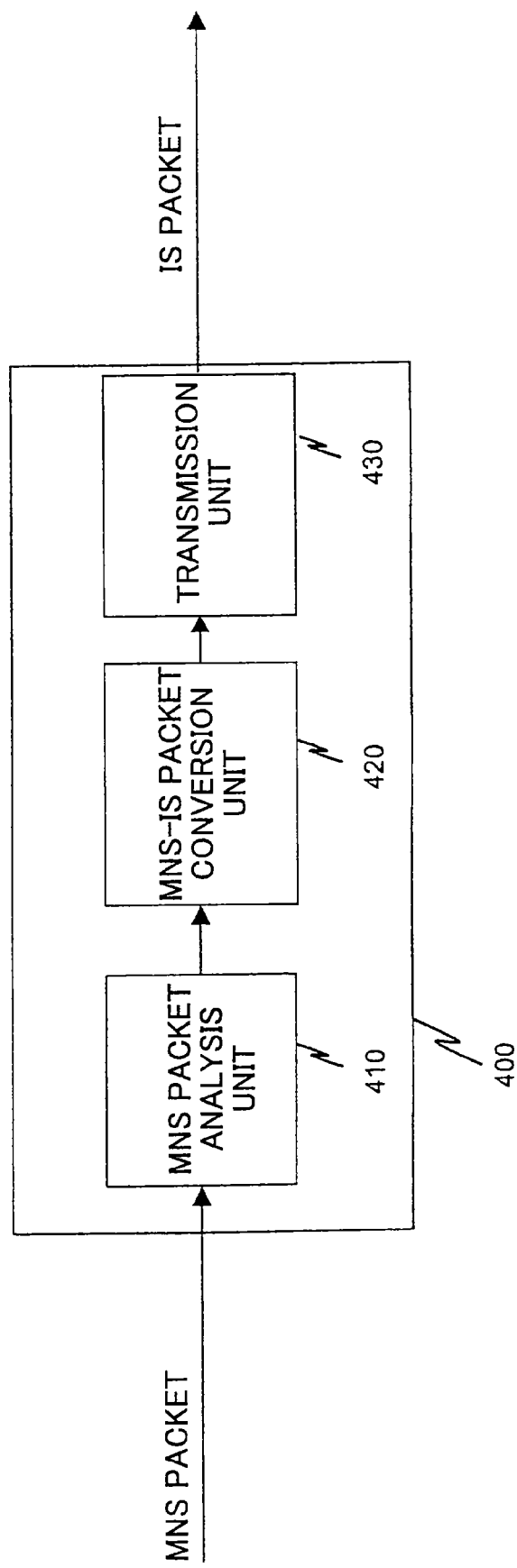
FIG. 12 is a block diagram illustrating the structure of a protocol conversion device in accordance with one embodiment of the present invention.

FIG. 12 is a block diagram illustrating the structure of the protocol conversion device 400. As shown in FIG. 12, the protocol conversion device 400 is provided with packet conversion functions including a protocol conversion function that enables the mobile device 100 to make an access to the Internet. More specifically, the protocol conversion device 400 includes an MNS packet analysis unit 410 that analyzes packets (MNS packets) to be handled in the mobile network system (hereinafter referred to as the "MNS"), an MNS-IS packet conversion unit 420 that converts the above MNS packets into IS packets that can be handled in the information server (hereinafter referred to as the "IS"), and a transmission unit 430 that transmits the packets (IS packets) converted from the MNS packets by the MSN-IS packet conversion unit 420.

Figure 13:
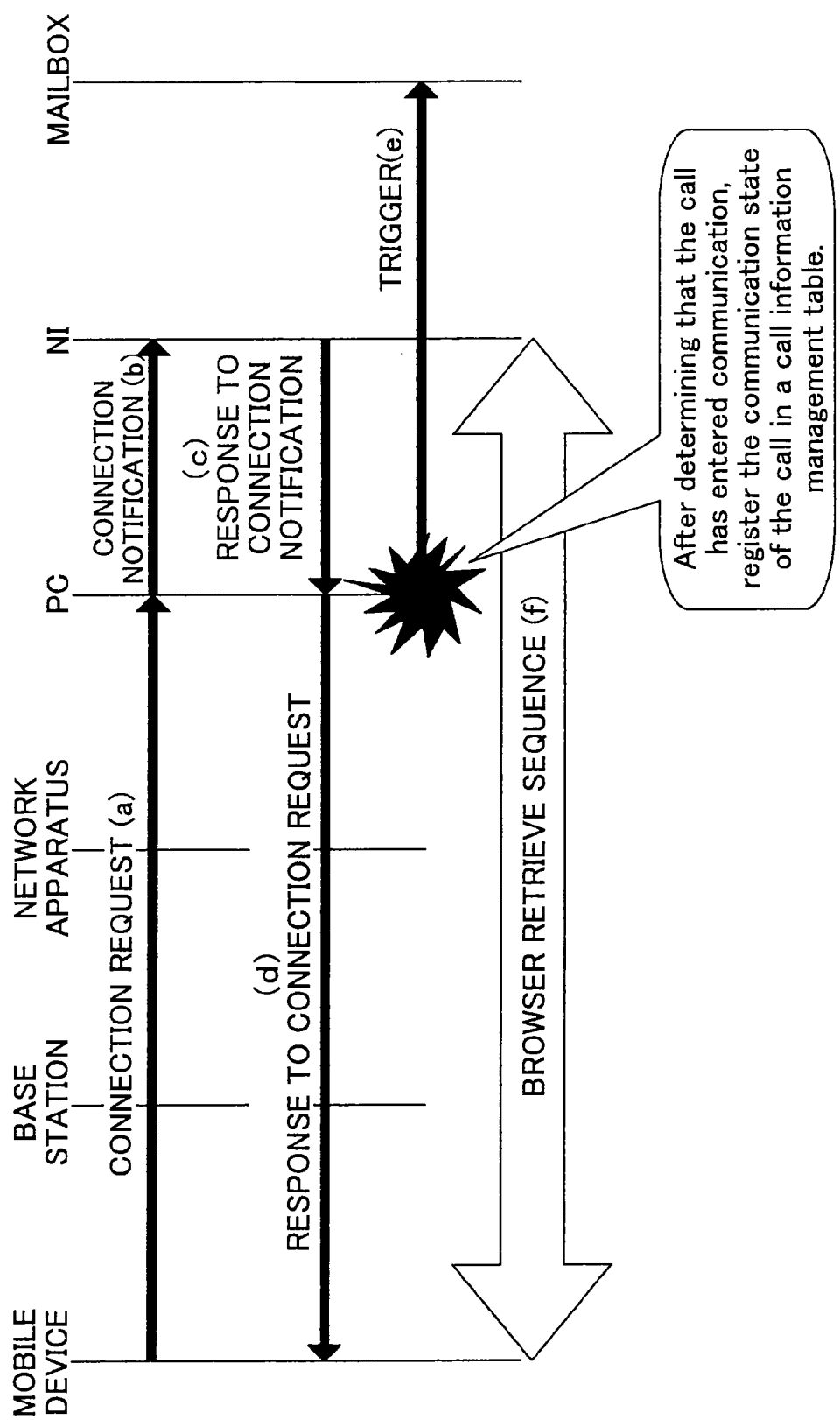
FIG. 13 is a flowchart of an operation of controlling reception notification for a mobile device 100 to be performed by the protocol conversion device.

FIG. 13 is a flowchart of the reception notification control operation to be performed on the mobile device 100 by the above protocol conversion device 400.

When a connection request (a) is sent from the mobile device 100 to the network apparatus 300, a communication line setting sequence for establishing a communication line between the mobile device 100 and the network apparatus 300 is started. At the point where a "connection notification response (c)" obtained at the start of the communication line setting sequence is transmitted to the network apparatus 300, the protocol conversion device 400 determines that the call has entered communication, and inquires of the mailbox 610 whether there are stored information addressed to the mobile device 100 (e). Upon receipt of a message indicating the existence of stored information addressed to the mobile device 100 from the mailbox 610, a reception notification directed to the mobile device 100 is loaded on the U-PLANE for transferring user information in a browser retrieve sequence (f) after the establishment of the communication line, and is then transmitted to the mobile device 100. Accordingly, the network resource can be efficiently utilized.

In the protocol conversion device 400, when the call from the mobile device 100 is determined to have entered communication, the communication state of the call is registered in a call information management table shown in FIG. 14. In this call information management table, the mobile subscriber number (MSN) and the connection ID (CID) of the mobile device in communication are registered, as well as other necessary information such as the communication start time of the mobile device. When receiving a reception notification directed to a mobile device from the mailbox 610, the protocol conversion device 400 refers to the call information management table for determining whether the mobile device is in communication. If the mobile device is in communication, the protocol conversion device 400 loads the reception notification directed to the mobile device on the C-PLANE that has already been established, and then sends it to the mobile device.

By using the call information management table in this manner, the communication state of each mobile device can be constantly obtained. Accordingly, even if there is a new call or a reception directed to a mobile device in communication, reception notification can be performed using the resource that has already been established.

Although the above description has been made taking a mobile communication system as an example, application of the present invention is not limited to the mobile communication system. For example, the present invention can be applied to a cable communication system. In that case, a reception terminal such as a personal computer takes the place of a mobile device in a mobile communication system, and a predetermined switching center apparatus used in a cable communication network is equivalent to the network apparatus in a mobile communication system. In a case where the present invention is applied to a cable communication system, a reception terminal cannot receive mails even if there are mails addressed to the reception terminal in the mail server while the reception terminal is off or is not connected to the network apparatus. On the other hand, when the reception terminal is on and is connected to the network apparatus, the reception terminal can receive reception notifications with respect to mails and advertisements. Accordingly, reception notification directed to a reception terminal is performed only when the reception terminal is connected to a network apparatus, and there is no need to establish a reception notification link for distributing information that does not require instant delivery. Thus, the network resource of the network apparatus can be efficiently utilized also in the case of a cable communication system. Furthermore, even in the case of a cable communication system, mails stored in the mail server can be classified into instant mails and non-instant mails, so that the communication fees for distributing information such as advertisements that do not require instant delivery can be set at lower price rates. As a result, services can be provided at price rates in accordance with the types of information to be distributed to users. Thus, a fair price system for users can be established in accordance with the present invention.

In the above embodiments, the reception function of the mailbox 40 is equivalent to a reception notification trigger receiving means, and the reception notifying function of the mailbox 40 is equivalent to a reception notifying means. The function of the mailbox 40 for detecting mails addressed to a mobile device is equivalent to a determining means, and the mail storage function of the mailbox 40 is equivalent to an information holding means. The function of the node interface device 500 is equivalent to a reception notifying means or a reception notification loading means, and the reception information notifying function of the mobile communication network 20 and the gateway unit 30 is equivalent to a receiving means. Further, the communication state monitoring function of the protocol conversion device 400 is equivalent to a communication state determining means, the stored information checking function of the protocol conversion device 400 is equivalent to a stored information inquiring means, and the reception notification control function of the protocol conversion device 400 is equivalent to a reception notifying means.

As described so far, in accordance with the present invention, when a connection request for an access to the Web or the like is made from a mobile device, it is determined whether the mailbox holds mails addressed to the mobile device. If there are mails stored in the mailbox, a reception notification to prompt the mobile device to collect the mails is transmitted from the mailbox to the mobile device via the mobile communication network/the gateway unit. Here, the packet link that has already been connected is used for the notification of the reception, so that the network resource can be efficiently utilized. Also, mails stored in the mailbox are classified into instant mails that require instant delivery and non-instant mails that do not require instant delivery. Reception notification is controlled in different manners depending on which group each mail belongs to. Thus, services can be provided at price rates that are advantageous to users.

Also in accordance with the present invention, the node device checks the communication state of each reception terminal, and, if the reception terminal is in communication, the node device inquires of the information server whether information addressed to the reception terminal is stored in the information server. If information addressed to the reception terminal is stored in the information server, a reception notification can be transmitted to the reception terminal through a predetermined communication line that has been established for regular communication. Accordingly, the network resource can be efficiently utilized.

It should be understood that the present invention is not limited to the above embodiments, but various modifications and changes may be made without departing from the scope of the present invention.

The invention claimed is:

1. A reception notification control method for making a reception notification, via a network apparatus, to reception terminals from an information server that stores information addressed to each of the reception terminals, the method comprising:
 storing, in the information server, information addressed to an arbitrary reception terminal;
 classifying the information addressed to each of the reception terminals, arriving at the information server, into instant delivery information which requires instant delivery and non-instant delivery information which does not require instant delivery, based on identification information which is added to the information addressed to each of the reception terminals at a distribution source of said information, when storing said information in the information server; and
 making a reception notification of the non-instant delivery information addressed to said arbitrary reception terminal from the information server, via the network apparatus, to the arbitrary reception terminal, the reception notification being triggered by a HTTP connection request transmitted from the arbitrary reception terminal and received via the network apparatus for establishing a HTTP packet link therebetween to receive a service unrelated to e-mail retrieval, the reception notification of the information server being provided via the established HTTP packet link between the arbitrary reception terminal and the network apparatus thereby avoiding a further HTTP packet link establishment to the information server for receiving the reception notification;

wherein the reception notification is provided together with the unrelated service.

2. The reception notification control method as claimed in claim 1, wherein the step of making the reception notification includes:

determining, when storing the information addressed to the arbitrary reception terminal in the information server, whether the arbitrary reception terminal, to which the information is addressed, is in communication with the network apparatus via a HTTP packet link, based on intrinsic information of the arbitrary reception terminal included in the information; and making the reception notification to the arbitrary reception terminal from the information server when it is determined that the arbitrary reception terminal is in communication with the network apparatus via the HTTP packet link.

3. The reception notification control method as claimed claim 1, wherein the step of making the reception notification includes:

holding, in the information server, information having predetermined identification information attached thereto among the classified information; and making the reception notification to the arbitrary reception terminal, upon receipt of a predetermined HTTP connection request, via the network apparatus, from the arbitrary reception terminal to which the held information is addressed.

4. The reception notification control method as claimed in claim 3, wherein the predetermined identification information indicates whether the information to be distributed requires instant delivery.

5. The method of claim 1, wherein the reception notification identifies information corresponding to the arbitrary reception terminal.

6. The reception notification control method as claimed in claim 1, wherein the identification information which is added includes a discount flag added to each non-instant delivery information indicating that the non-instant delivery information is deliverable at a lower communication price rate than the instant delivery information.

7. A reception notification control method in which an information server that stores e-mail addressed to reception terminals, makes a reception notification to each of the reception terminals via a network apparatus, with a node device interposed between the network apparatus and the information server, the method comprising:

classifying the e-mail addressed to each of the reception terminals, arriving at the information server, into instant delivery e-mail which requires instant delivery and non-instant delivery e-mail which does not require instant delivery, based on identification information which is added to the e-mail addressed to each of the reception terminals at a distribution source of said e-mail, when storing said e-mail in the information server;

determining a communication state of an arbitrary reception terminal in accordance with a control signal that is transmitted when a HTTP packet link is established between the arbitrary reception terminal and the network apparatus, inquiring the information server whether the information server stores e-mail addressed to the arbitrary reception terminal when it is determined that the arbitrary reception terminal has established the HTTP packet link with the network apparatus to receive a service unrelated to e-mail retrieval; and making a reception notification of the non-instant delivery e-mail addressed to the arbitrary reception terminal depending on a result of the inquiry over the established HTTP packet link together with the unrelated service, each of said determining and said making being carried out by the node device.

8. A reception notification control method as claimed claim 7, wherein the step of making the reception notification includes:

registering, in the node device, the communication state of the arbitrary reception terminal in a call information management table, when it is determined that the arbitrary reception terminal is in communication with the network apparatus;

acquiring, in the node device, the communication state of the arbitrary reception terminal from the call information management table, when a call for the arbitrary reception terminal is received from the information server; and making the reception notification from the node device to the arbitrary reception terminal using a predetermined packet link that is established in advance, when it is determined that the arbitrary reception terminal is in communication with the network apparatus.

9. The reception notification control method as claimed in claim 7, wherein the node device is provided with a packet conversion function that enables the node device to make a communication with the arbitrary reception terminal via the network apparatus.

10. The reception notification control method as claimed in claim 7, wherein the communication between the network apparatus and the node device is made via a protocol conversion device that has a packet conversion function and enables the node device to make a communication with the arbitrary reception terminal via the network apparatus.

11. The reception notification control method as claimed in claim 7, wherein the information server and the node device are separate devices.

12. A reception notification control method as claimed in claim 7, wherein the identification information which is added includes a discount flag added to each non-instant delivery e-mail indicating that the non-instant delivery e-mail is deliverable at a lower communication price rate than the instant delivery e-mail.

13. A reception notification system for making a reception notification, via a network apparatus, to reception terminals from an information server that stores e-mail addressed to each of the reception terminals, the system comprising:

a classifying part configured to classify the e-mail addressed to each of the reception terminals, arriving at the information server, into instant delivery e-mail which requires instant delivery and non-instant delivery e-mail which does not require instant delivery, based on identification information which is added to the e-mail addressed to each of the reception terminals at a distribution source of said e-mail, when storing said e-mail in the information server;

a reception notification trigger receiving part configured to receive a HTTP connection request for establishing an HTTP packet link, the request being transmitted from an arbitrary reception terminal to which e-mail stored in the information server is addressed and received via the network apparatus; and a reception notifying part configured to make a reception notification of the non-instant delivery e-mail addressed to the arbitrary reception terminal, the reception notification being triggered when the reception notification trigger receiving part receives the HTTP connection request, the reception notification trigger receiving part and the reception notifying part being provided in the information server and the reception notification packet being provided via the HTTP packet link established between the arbitrary reception terminal and the network apparatus for delivering a service unrelated to e-mail retrieval, thereby avoiding a further packet link establishment to the information server for receiving the reception notification as the reception notification being provided together with the unrelated service.

14. The reception notification system as claimed in claim 13, further comprising:
a determining part included in the information server and configured to determine, when storing the e-mail addressed to the arbitrary reception terminal in the information server, whether the arbitrary reception terminal, to which the e-mail is addressed, has established the HTTP packet link with the network apparatus, based on intrinsic information of the arbitrary reception terminal included in the e-mail,
wherein the reception notifying makes the reception notification to the arbitrary reception terminal when the determining part determines that the arbitrary reception terminal has established the HTTP packet link with the network apparatus.

15. The reception notification system as claimed in claim 13, further comprising:
an e-mail holding part included in the information server and configured to hold e-mail having predetermined identification information among the e-mail classified by the classifying part,
wherein the reception notification part makes the reception notification to the arbitrary reception terminal, upon receipt of a predetermined HTTP connection request, via the network apparatus, from the arbitrary reception terminal to which the e-mail held by the e-mail holding part is addressed.

16. The reception notification system as claimed in claim 15, wherein the predetermined identification information indicates whether the e-mail to be distributed requires instant delivery.

17. A reception notification system in which an information server that stores e-mail addressed to reception terminals and makes a reception notification to each of the reception terminals via a network apparatus with a node device interposed between the network apparatus and the information server, the system comprising:
a classifying part configured to classify the e-mail addressed to each of the reception terminals, arriving at the information server, into instant delivery e-mail which requires instant delivery and non-instant delivery e-mail which does not require instant delivery, based on identification information which is added to the e-mail addressed to each of the reception terminals at a distribution source of said e-mail, when storing said e-mail in the information server;
a communication state determining part configured to determine a communication state of an arbitrary reception terminal in accordance with a control signal that is transmitted when a HTTP packet link is established between the arbitrary reception terminal and the network apparatus to access a service unrelated to e-mail retrieval;
a stored information inquiring part configured to inquire the information server whether the information server stores e-mail addressed to the arbitrary reception terminal, when the communication state determining part determines that the arbitrary reception terminal has established the HTTP packet link with the network apparatus; and
a reception notifying part configured to make a reception notification of the non-instant delivery e-mail addressed to the arbitrary reception terminal depending on a result of the inquiry made by the stored information inquiring part and the reception notification being provided via the HTTP packet link between the arbitrary reception terminal and the network apparatus thereby avoiding a further packet link establishment to the information server for receiving the reception notification as the reception notification is provided together with the unrelated service;
each of the communication state determining part, the stored information inquiring part, and the reception notifying part being provided in the node device.

18. A reception notification as claimed in claim 17, further comprising:
a call information managing part, included in the node device, and configured to register the communication state of the arbitrary reception terminal in a call information management table, when the communication state determining part determines that the arbitrary reception terminal is in communication with the network apparatus; and
a communication state acquiring part, included in the node device, and configured to acquire the communication state of the arbitrary reception terminal from the call information management table, when a call for the arbitrary reception terminal is received from the information server.

19. An information server for making a reception notification to reception terminals via a network apparatus, comprising:
a storage part configured to store e-mail addressed to each of reception terminals;
a classifying part configured to classify the e-mail addressed to each of the reception terminals, arriving at the information server, into instant delivery e-mail which requires instant delivery and non-instant delivery e-mail which does not require instant delivery, based on identification information which is added to the e-mail addressed to each of the reception terminals at a distribution source of said e-mail, when storing said e-mail in the information server,
a reception notification trigger receiving part configured to receive a HTTP connection request that is for establishing a HTTP packet link and is transmitted from an arbitrary reception terminal to which e-mail stored in the storage part is addressed for accessing a service unrelated to e-mail retrieval, via the network apparatus; and
a reception notifying part configured to make a reception notification of the non-instant delivery e-mail addressed to the arbitrary reception terminal when the reception notification trigger receiving part receives the HTTP connection request and the reception notification being provided via the HTTP packet link between the arbitrary reception terminal and the network apparatus thereby avoiding a further packet link establishment to the information server for receiving the reception notification as the reception notification is provided together with the unrelated service.

20. The information server as claimed in claim 19, further comprising:

an information holding part configured to hold e-mail having predetermined identification information among the e-mail classified by the classifying part, wherein the reception notifying part makes the reception notification to the arbitrary reception terminal, upon receipt of a predetermined HTTP connection request, via the network apparatus, from the arbitrary reception terminal to which the e-mail held by the information holding part is addressed.

21. The information server as claimed in claim 20, wherein the predetermined identification information indicates whether the e-mail to be distributed requires instant delivery.

22. The information server as claimed in claim 19, wherein the identification information which is added includes a discount flag added to each non-instant delivery e-mail indicating that the non-instant delivery e-mail is deliverable at a lower communication price rate than the instant delivery e-mail.

23. A node device for a reception notification system in which an information server that stores e-mail addressed to reception terminals and makes a reception notification to each of the reception terminals via a network apparatus with the node device interposed between the network apparatus and the information server, said information server comprising a classifying part configured to classify the e-mail addressed to each of the reception terminals, arriving at the information server, into instant delivery e-mail which requires instant delivery and non-instant delivery e-mail which does not require instant delivery, based on identification information which is added to the e-mail addressed to each of the reception terminals at a distribution source of said e-mail, when storing said e-mail in the information server;

the node device comprising:

a communication state determining part configured to determine a communication state of an arbitrary reception terminal in accordance with a control signal that is transmitted when a HTTP packet link is established between the arbitrary reception terminal and the network apparatus to accessing a service unrelated to e-mail retrieval;

a stored information inquiring part configured to query the information server as to whether the information server stores e-mail addressed to the arbitrary reception terminal, when the communication state determining part determines that the arbitrary reception terminal has established the HTTP packet link with the network apparatus; and a reception notifying part configured to make a reception notification of the non-instant delivery e-mail addressed to the arbitrary reception terminal depending on a result of the inquiry made by the stored information inquiring part and the reception notification being provided via the HTTP packet link between the arbitrary reception terminal and the network apparatus thereby avoiding a further packet link establishment to the information server for receiving the reception notification as the reception notification is provided with the unrelated service.

* * * * *